3,061,506
IODINE PHOSPHATE ESTER COMPOSITIONS
Leslie G. Nunn, Jr., Metuchen, and Robert C. Wilson, Cranford, N.J., assignors to General Aniline & Film Corporation, New York, N.Y., a corporation of Delaware
No Drawing. Filed Apr. 29, 1960, Ser. No. 25,541
6 Claims. (Cl. 167—17)

This invention relates to iodine phosphate ester compositions having germicidal-detergent properties.

It is well known that liquid, nonionic, polyglycol ether type surface active agents, obtained by condensing alkylene oxides with water-insoluble organic compounds containing at least 6 carbon atoms and having an active hydrogen, are capable of readily dissolving iodine to yield germicidal-detergent compositions. Compositions of this type are fully described in British Patent 703,091. In the compounding of such germicidal-detergent compositions, it is necessary that they be formulated so as to contain a sufficient amount of acid, water, 0.5–2.0% available iodine, and frequently, additional nonionic surfactant. Accordingly, the germicidal detergent compositions must be compounded with sufficient acid to maintain a pH of 5 or lower in the final dilution. Phosphoric acid is chosen in commercial compounding because it is non-volatile, has low toxicity and buffers the solutions in the proper pH range. However, other acids are employed.

It is recognized by the patent art that phosphoric acid, salts thereof and monoalkyl phosphates of the general formula:

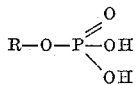

and dialkyl phosphites as well as dialkyl phosphates of the general formula:

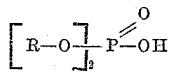

have no tendency to solubilize elemental iodine in aqueous media or to form iodine complexes.

Contrary to the foregoing recognition, I surprisingly discovered that monoalkyl-, dialkyl-, and trialkyl-polyoxyethylene phosphates as well as the corresponding mono-, di- and triaryl polyoxyethylene phosphates do in fact solubilize elemental iodine in aqueous media or form complexes therewith.

I have also discovered that such phosphates when treated with elemental iodine yield excellent germicidal-detergent compositions that do not require compounding with phosphoric acid or other acids to maintain a pH of 5 or lower in the final dilution. This particular feature is highly desirable since it eliminates the handling of acid by the compounder and permits him to formulate effective germicidal-detergent compositions by dilution with water or the addition of other ingredients to yield a combination of properties required for the intended end use.

Accordingly, the principal object of the present invention is to provide a new class of iodine phosphate ester compositions which are particularly useful as germicidal-detergents and are readily adaptable for further compounding of compositions having desirable available iodine content without the need of acid.

Other objects and advantages will appear hereinafter.

In preparing the iodine phosphate ester compositions of the present invention any alkyl or aryl polyoxyethylene phosphate is treated with elemental iodine at a temperature of 60–70° C. The phosphate esters that are used per se or mixtures thereof are those characterized by the following formulae:

(1) 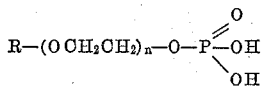

(2) 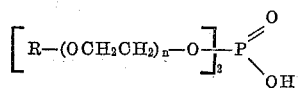

(3) 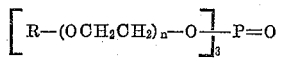

wherein R represents an alkyl radical containing from 8 to 27 carbon atoms, e.g. octyl, nonyl, decyl, hendecyl, dinonyl, dodecyl, tridecyl, tetradecyl, pentadecyl, hexadecyl, heptadecyl, octadecyl, nonadecyl, eicosyl, heneicosyl, docosyl, tricosyl, tetracosyl, pentacosyl, hexacosyl, and heptacosyl, or an aryl radical of 6 to 24 carbon atoms, e.g. phenyl, diphenyl, naphthyl, etc. which are unsubstituted or substituted by an alkyl radical of from 1 to 18 carbon atoms, e.g. dimethylphenyl, dipropylphenyl, nonylphenyl, dinonylphenyl, octadecylphenyl, etc., and $n$ represents an integer of from 2 to 100.

The polyoxyethylenated straight and branched chain alkyl alcohols of 8 to 27 carbon atoms and the polyoxyethylenated aryl alcohols and the various alkylates thereof characterized by the above general formulae, prior to phosphate ester formation, are prepared by the usual methods known to the art. Suitable methods for their preparation are described in United States Patents 1,970,-578; 2,213,477; 2,575,832; 2,593,112 and 2,676,975, the complete disclosures and teachings of which are incorporated herein by reference thereto.

The foregoing esters are readily prepared by the usual esterification procedure while employing polyphosphoric acid, ½ $P_2O_5 \cdot H_2O$ which is a partially dehydrated phosphoric acid, at atmospheric pressure and at a temperature of about 115° C. for a period of 4 hours. Phosphorus oxychloride ($POCl_3$) may also be used, especially for mono-, di- and tri-esters. Anhydrous phosphorus pentoxide is another reagent. Phosphorus trichloride results in phosphites. The degree of esterification depends largely on the ratio of equivalents of the reactants although the nature of the reactants and the reaction conditions also influence the results. For monoesters, a 1:1 ratio of equivalents is used. For diesters, a ratio of 2 equivalents of the hydroxy compound to 1 equivalent of the phosphorus compound is used. For triesters, a ratio of 3 equivalents of the hydroxy compound to 1 equivalent of the phosphorus compound is used.

It will be readily appreciated by those skilled in the organic syntheses art that the preparation of the individual esters characterized by the foregoing Formulae 1, 2 and 3 in substantial yields is quite difficult. In majority of cases when preparing a monoester, a certain amount of diester will also be formed. The same is true in the preparation of a diester wherein some monoester is formed. If phosphorous oxychloride is used instead of phosphorous pentoxide, mixtures of all three esters will be formed. The preparations will depend on the relative concentrations of reactants and reaction conditions. Therefore, for the purpose of the present invention, it is immaterial whether a monoester, diester or triester per se is employed or mixtures of such esters since when either alone or a mixture thereof is treated with elemental iodine at a temperature between 60 and 70, as will be pointed out hereinafter, iodine phosphate ester compositions will be obtained containing from 0.1% to 28.5% iodine and from 0.08% to 24.5% available iodine. The latter is that portion of the total iodine present which is germicidally active and is determined by reduction with sodium thiosulfate.

The mixture of phosphate esters to be employed in the preparation of the iodine phosphate ester compositions in accordance with the present invention is that obtained in accordance with the process described in my copending application Serial No. 856,367, filed December 1, 1959, now U.S. Patent No. 3,004,057, and copending application Serial No. 852,188, filed November 12, 1959, now U.S. Patent No. 3,004,056, the complete teachings of which are incorporated herein by reference thereto. Since the processes described in these copending applications are more economically advantageous, I therefore prefer to use such ester mixtures. It again being clearly understood that the individual mono-, di- and tri-esters per se are likewise employable to yield germicidal surfactant iodine compositions.

While the phosphate esters prepared from polyoxyethylenated organic hydroxy compounds, e.g. alkyl and aryl alcohols are preferred, it is to be understood that in place of such polyoxyethylenated alcohols, polyoxyethylenated derivatives of other organic compounds containing an active hydrogen may be employed in the production of phosphoric acid esters. The number of such polyoxyethylenated derivatives are known in the art, being described for example in U.S. Patent 1,970,578 and include polyoxyethylenated derivatives of amines, amides, carboxylic acids and the like.

As specific illustrations of the phosphoric acid esters prepared from alkyl and aryl alcohols, the following are representative:

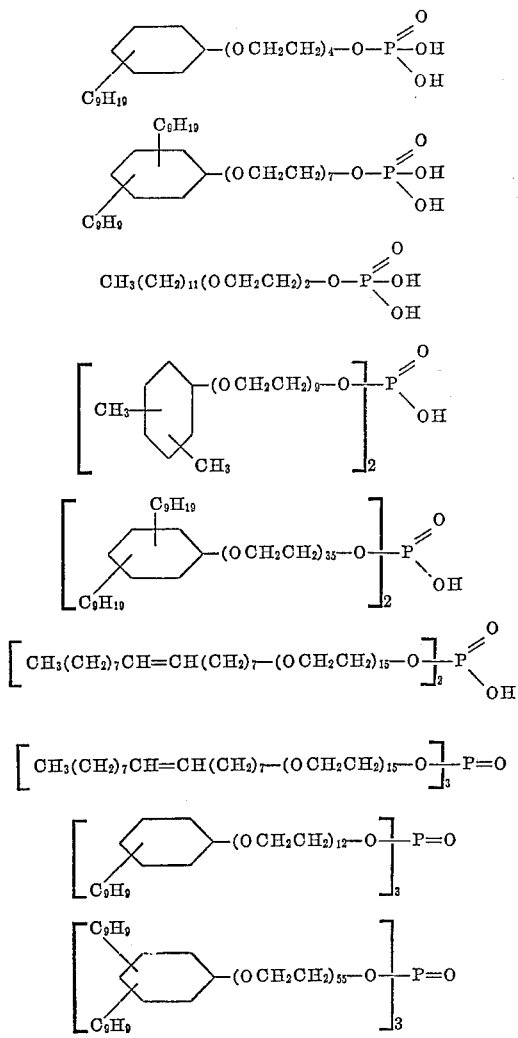

In practicing the present invention 0.1 to 28.5 parts by weight of elemental iodine is added to 99.9 to 71.5 parts by weight of the ester per se or mixtures thereof at room or elevated temperature. If the monoester, diester or triester or mixtures of such esters is a solid, it should be melted by heating to a temperature ranging between 45–75° C. before the iodine is added.

The following examples will illustrate the manner in which the iodine phosphate ester compositions of the present invention are prepared. All parts given are by weight.

*Example I*

The condensation product of 1 mole of nonylphenol with 15 moles of ethylene oxide prepared according to conventional means was converted into a phosphate ester by reacting 2.7 moles of the polyethoxylenated nonylphenol with 1 mole of phosphorous pentoxide, in accordance with the procedure described in my copending application Serial No. 856,367 referred to above. A total of 252.4 parts of the phosphate ester thus prepared, which consists of a mixture containing 59 parts of monoester, 30 parts of diester and 11 parts of polyethoxylenated nonylphenol, was charged to a reaction vessel and heated to 65° C. with agitation. One hundred parts of iodine were added over a 15-minute interval and stirred at 65° C. for 3 hours. At the end of this period the material was cooled to a dark brown liquid which was completely soluble in water at room temperature. Analysis showed the material to contain 28.5% iodine and 22.3% available iodine. The pH of a 5% aqueous solution was 1.3.

The stability of the foregoing preparation was evaluated by mixing 20 parts thereof with 5 parts of the condensate of 1 mole of nonylphenol with 30 moles of ethylene oxide and adding sufficient water to make a total of 100 parts by weight of a clear brown solution. The solution remained clear without any separation or sediment after storage for 24 hours at 50° C.

*Example II*

The condensation product of 1 mole of octyl alcohol with 10 moles of ethylene oxide was converted into a phosphate ester by reacting 3 moles of the polyethoxylenated octyl alcohol with 1 mole of phosphorous pentoxide in accordance with the procedure described in my copending application Serial No. 856,367 referred to above. A total of 87 parts of the phosphate ester thus prepared, which consists of a mixture containing 49 parts of monoester, 37 parts of diester and 14 parts of polyethoxylenated octyl alcohol was charged to a reaction vessel and heated to 65° C. with agitation. Thirteen parts of iodine were added over a 15 minute interval and stirred at 65° C. for 3 hours. At the end of this period the material was cooled to a dark brown liquid which was completely soluble in water at room temperature. Analysis showed the material to contain 13% iodine and 10% available iodine. The pH of a 5% aqueous solution was 1.5.

In subjecting the foregoing preparation to the stability test of Example I, it was found that the solution remained clear without any separation or sediment after storage for 24 hours at 50° C.

*Example III*

The condensation product of 1 mole of phenol with 15 moles of ethylene oxide was converted into a phosphate ester by reacting 4 moles thereof with 1 mole of phosphorous pentoxide in accordance with the procedure described in my copending application Serial No. 856,367. A total of 93 parts of the phosphate ester thus prepared, which consists of a mixture containing 25 parts of monoester, 52 parts of diester and 23 parts of polyethoxylenated phenol was charged to a reaction vessel and heated to 65° C. with agitation. Seven parts of iodine were added over a 15 minute interval and stirred at 65°

C. for 3 hours. At the end of this period the material was cooled to a dark brown liquid which was completely soluble in water at room temperature. Analysis showed the material to contain 7% iodine and 5% available iodine. The pH of a 5% aqueous solution was 1.6.

In subjecting the foregoing preparation to the stability test of Example I, it was found that the solution remained clear without any separation or sediment after storage for 24 hours at 50° C.

*Example IV*

The condensation product of 1 mole of β-naphthol with 15 moles of ethylene oxide was converted into a phosphate ester by reacting 3 moles of the polyethoxylenated β-naphthol with 1 mole of phosphorous pentoxide in accordance with the procedure described in my copending application Serial No. 856,367. A total of 97 parts of the phosphate ester thus prepared, which consists of a mixture containing 59 parts of monoester, 33 parts of diester and 8 parts of polyethoxylenated naphthol, was charged to a reaction vessel and heated to 65° C. with agitation. Three parts of iodine were added over a 15 minute interval and stirred at 65° C. for 3 hours. At the end of this period the material was cooled to a dark brown liquid which was completely soluble in water at room temperature. Analysis showed the material to contain 3.0% iodine and 2.1% available iodine. The pH of a 5% aqueous solution was 1.9.

In subjecting the foregoing preparation to the stability test of Example I, it was found that the solution remained clear without any separation or sediment after storage for 24 hours at 50° C.

*Example V*

The condensation product of 1 mole of lauryl alcohol with 15 moles of ethylene oxide was converted into a phosphate ester by reacting 3 moles of the polyethoxylenated lauryl alcohol with 1 mole of phosphorous pentoxide, in accordance with the procedure described in my copending application Serial No. 856,367. A total of 75 parts of the phosphate ester thus prepared, which consists of a mixture containing 49 parts of monoester, 43 parts of diester and 8 parts of polyethoxylenated lauryl alcohol, was charged to a reaction vessel and heated to 65° C. with agitation. Twenty-five parts of iodine were added over a 15 minute interval and stirred at 65° C. for 3 hours. At the end of this period the material was cooled to a dark brown liquid which was completely soluble in water at room temperature. Analysis showed the material to contain 25% iodine and 19.6% available iodine. The pH of a 5% aqueous solution was 1.4.

In subjecting the foregoing preparation to the stability test of Example I, it was found that the solution remained clear without any separation or sediment after storage for 24 hours at 50° C.

*Example VI*

The condensation product of 1 mole of octadecyl phenol with 20 moles of ethylene oxide was converted into a phosphate ester by reacting 3 moles of the polyethoxylenated octadecyl phenol with 1 mole of phosphorous pentoxide in accordance with the procedure described in my copending application Serial No. 856,367. A total of 99 parts of the phosphate ester thus prepared, which consists of a mixture containing 47 parts of monoester, 36 parts of diester and 17 parts of polyethoxylenated octadecyl phenol, was charged to a reaction vessel and heated to 65° C. with agitation. One part of iodine was added over a 15 minute interval and stirred at 65° C. for 3 hours. At the end of this period the material was cooled to a dark brown liquid which was completely soluble in water at room temperature. Analysis showed the material to contain 1% iodine and 0.7% available iodine. The pH of a 5% aqueous solution was 2.5.

In subjecting the foregoing preparation to the stability test of Example I, it was found that the solution remained clear without any separation or sediment after storage for 24 hours at 50° C.

*Example VII*

Example I was repeated with the exception that 2.7 moles of the polyethoxylenated nonylphenol was replaced by 1 mole thereof and reacted with 1 mole of phosphorus pentoxide. A total of about 85 parts of the phosphate ester thus prepared, which consisted of a mixture containing predominantly 40 parts of the monoester, 49 parts of diester and 11 parts of polyethoxylenated nonylphenol, was charged to a reaction vessel and heated to 65° C. with agitation. Fifteen parts of iodine were added over a 15 minute interval and stirred at 65° C. for 3 hours. At the end of this period the material was cooled to a dark brown liquid which was completely soluble in water at room temperature. Analysis showed the material to contain 15% iodine and 11.3% available iodine. The pH of a 5% aqueous solution was 1.6.

In subjecting the foregoing preparation to the stability test of Example I, it was found that the solution remained clear without any separation or sediment after storage for 24 hours at 50° C.

*Example VIII*

The condensation product of 1 mole of nonylphenol with 15 moles of ethylene oxide was converted into a phosphate ester by reacting 2 moles of the polyethoxylenated nonylphenol with 1 mole of phosphorous pentoxide. A total of 83 parts of the phosphate ester thus prepared, which consisted of a mixture containing predominantly 48 parts of diester, 56 parts of monoester and 6 parts of polyethoxylenated nonylphenol, was charged to a reaction vessel and heated to 65° C. with agitation. Seventeen parts of iodine were added over a 15 minute interval and stirred at 65° C. for 3 hours. At the end of this period the material was cooled to a dark brown liquid which was completely soluble in water at room temperature. Analysis showed the material to contain 17% iodine and 12.6% available iodine. The pH of a 5% aqueous solution was 1.3.

In subjecting the foregoing preparation to the stability test of Example I, it was found that the solution remained clear without any separation or sediment after storage for 24 hours at 50° C.

*Example IX*

The condensation product of 1 mole of nonylphenol with 15 moles of ethylene oxide was converted into a phosphate ester by reacting 3 moles of the polyethoxylenated nonylphenol with 1 mole of phosphorous oxychloride at 40° C. and stripping under reduced pressure at 80° C. to remove unwanted chlorides. A total of 86 parts of phosphate ester thus prepared, which consisted of a mixture containing 55 parts of triester, 23 parts of monoester and 17 parts of diester and 5 parts of polyethoxylenated nonylphenol, was charged to a reaction vessel and heated to 65° C. with agitation. Fourteen parts of iodine were added over a 15 minute interval and stirred at 65° C. for 3 hours. At the end of this period the material was cooled to a dark brown liquid which was completely soluble in water at room temperature. Analysis showed the material to contain 14% iodine, and 10% available iodine. The pH of a 5% aqueous solution was 1.6.

In subjecting the foregoing preparation to the stability test of Example I, it was found that the solution remained clear without any separation or sediment after storage for 24 hours at 50° C.

*Example X*

The condensation product of 1 mole of lauryl alcohol with 2 moles of ethylene oxide was converted into a phosphate ester by reacting 4 moles of the polyethoxylenated lauryl alcohol with 1 mole of phosphorous pentoxide. A total of 96 parts of the phosphate ester thus prepared, which consists of a mixture containing 39 parts of monoester, 47 parts of diester and 14 parts of polyethoxylenated lauryl alcohol, was charged to a reaction vessel and heated to 65° C. with agitation. Four parts of iodine were added over a 15 minute interval and stirred at 65° C. for 3 hours. At the end of this period the material was cooled to a uniform dark brown liquid which had 4.00% total iodine and 3.33% available iodine. The pH of a 5% aqueous solution was 1.7.

*Example XI*

The condensation product of 1 mole of nonylphenol with 100 moles of ethylene oxide was converted into a phosphate ester by reacting 3 moles of the polyethoxylenated nonylphenol with 1 mole of phosphorous pentoxide. A total of 10 parts of the phosphate ester thus prepared, which consists of a mixture containing 27 parts of monoester, 24 parts of diester and 49 parts of polyethoxylenated nonylphenol, was charged to a reaction vessel and heated to 65° C. with agitation. Thereafter, 90 parts of the mixture of esters and 10 parts of iodine were mixed with agitation for 3 hours at 60° C. to a uniform dark brown liquid, which solidified on cooling. The total iodine content of the preparation was 10% and the available iodine was 8.2%. The pH of a 5% aqueous solution was 1.9.

*Example XII*

A phosphate ester was prepared by reacting 3 moles of the condensation product of 1 mole of nonylphenol with 6 moles of ethylene oxide with 1 mole of phosphorous oxychloride at 40° C. and vacuum stripping at 80° C. to remove unwanted chlorides. Sixty parts of the ester mixture, which consists of 48 parts of triester, 26 parts of diester, and 15 parts of monoester, and 11 parts of polyethoxylenated nonylphenol was mixed with 5 parts of iodine at 65° C. for 3 hours. The resulting preparation had a total iodine content of 7.7% and an available iodine content of 5.3%.

*Example XIII*

A phosphate ester was prepared from the condensation product of 3 moles of oleyl alcohol and 7 moles of ethylene oxide by treatment with 1 mole of phosphorous oxychloride at 40° C. and vacuum stripping at 80° C. to remove unwanted chlorides. Forty-seven parts of the resulting ester mixture, containing 41 parts of triester, 53 parts of diester and 6 parts of polyethoxylenated oleyl alcohol, was treated with 3 parts of iodine for 3 hours at 60° C. The resulting composition was found to contain a total of 6% iodine and 4% available iodine.

*Example XIV*

The condensation product of 1 mole of dodecylphenol with 13 moles of ethylene oxide was converted into a phosphate ester by reacting 2 moles of the polyethoxylenated dodecylphenol with 1 mole of phosphorous oxychloride at 40° C. and vacuum stripped at 80° C. to remove unwanted chlorides. This mixture consisted of 44 parts of triester, 29 parts of diester and 16 parts of monoester together with 11 parts of polyethoxylenated dodecylphenol. The resulting ester mixture was partially neutralized to a pH of 4.5 with 30% aqueous sodium hydroxide to yield sodium salts of the mono- and di-esters of the mixture. A total of 95 parts of the resulting mixture was mixed with 5 parts of iodine at 65° C. and agitated for 3 hours at the same temperature. The final preparation had a total iodine content of 5% and available iodine content of 3.7%. A 10% aqueous solution of the final product has a pH of 3.2.

While the above example shows the partial neutralization of the acidic esters with aqueous caustic soda, it is to be noted that aqueous ammonium hydroxide or aqueous potassium hydroxide may also be used to adjust the pH to a desirable range of 4.5 to 6.5 prior to iodine treatment. Following the iodine treatment the aqueous solution of the final product may similarly be adjusted with these aqueous alkaline solutions to a pH above 2.5 to 4.5.

*Example XV*

The condensation product of 1 mole of nonlyphenol with 15 moles of ethylene oxide was converted into a phosphate ester by reacting 3 moles of polyethoxylenated nonylphenol with 1.3 mole of phosphorous oxychloride at 40° C. followed by raising of the temperature to 70° C. and then vacuum stripping to remove unwanted chlorides. The resulting mixture of monoester, diester and triester was passed through an anion exchange column to remove the monoester and diester. The triester remained in the eluate ends and was free of monoester and diester. A total of 8 parts of iodine was added with agitation over 15 minutes to 42 parts of the triester and heated at 65° C. The mixture was agitated for 3 hours at 65° C. to obtain a uniform brown liquid which partially solidified at room temperature. The resulting composition was found to contain a total of 16% iodine and 12.1% available iodine.

Within the pH range of 1.3 to 4.5 aqueous solutions of the final iodine product, as above prepared, yield the best biocidal activity and stability. In all cases where the acid esters per se or in admixture are partially neutralized to a pH of above 2.5 to 4.5, the final iodine phosphate ester composition has better detergency in addition to its biocidal activity and stability.

All of the final iodine preparations of the present invention either yield or may be formulated to yield aqueous solutions in normal tap water to contain up to as high as 22% of available iodine. However, where hard water may be encountered and to increase water solubility of the iodine product, from 3 to 10 parts by weight, usually around 5 parts by weight, of a condensate of 1 mole of nonylphenol with 20 moles of ethylene oxide may be added to the final iodine preparation. In cases where the water for dilution of the final iodine product is normal, but it is desired to reduce the foaming characteristics of the iodine phosphate ester composition, usually about 5 parts by weight of a condensate of 1 mole of nonylphenol with 2 moles of ethylene oxide may be added. The following formulations will illustrate these features:

| Formulations | Parts by Weight | | |
| --- | --- | --- | --- |
| | A | B | C |
| The final iodine product of Example IX | 17.5 | 17.5 | 17.5 |
| Condensate of 1 mole of nonylphenol with 20 moles of ethylene oxide | | 5.0 | |
| Normal Water | 82.5 | | 77.5 |
| Water having a hardness above 100 p.p.m. | | 77.5 | |
| Condensate of 1 mole of nonylphenol with 2 moles of ethylene oxide | | | 5 |
| Percent available iodine | 1.75 | 1.75 | 1.75 |

From the foregoing formulations it becomes apparent that with normal tap water, Formulation A contains the same percent of available iodine and displays excellent detergency, and from numerous tests, its biocidal activity and stability. In Formulation B, the hard water allows the formulation of the same composition with the identical percent available iodine by the incorporation of the nonylphenol condensate with 20 moles of ethylene oxide. In Formulation C where it is desired to reduce the foaming characteristics, the addition of the nonylphenol condensate with 2 moles of ethylene oxide to the formulation imparts these characteristics. The iodine phosphate ester compositions of the present invention are very effective as bactericides, sporicides, fungicides, virucides and protozoacides in hard or soft water at high or low temperatures. These compositions may be employed to combat a large group of microorganisms which include tuberculosis bacteria, all three strains of poliomyelitis as well as other bacteria, viruses, fungi, molds, algae, and various types of air-borne spores. As previously noted, the compositions serve a dual function of detergent and sanitizers and may be employed in concentrations between 25 and 100 parts per million of iodine for most applications.

We claim:

1. A composition of matter comprising iodine and at least one phosphate ester selected from the group corresponding to the following general formulae:

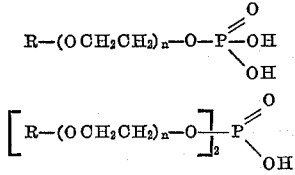

and

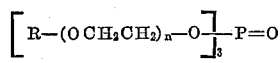

wherein R represents a member selected from the class consisting of alkyl radicals of 8 to 27 carbon atoms and aryl radicals of 6 to 24 carbon atoms, and $n$ represents an integer of from 2 to 100, said composition containing from 0.1% to 28.5% of iodine.

2. A composition of matter according to claim 1 wherein the phosphate ester consists of a mixture of esters having the following composition:

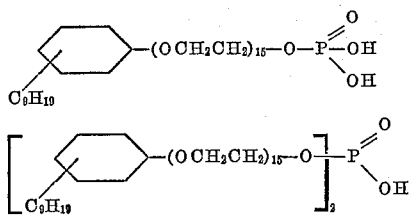

|  | Parts by Weight |
|---|---|
| (first ester) | 59 |
| (second ester) | 30 | said composition containing 28.5% iodine.

3. A composition of matter according to claim 1 wherein the phosphate ester consists of a mixture of esters having the following composition:

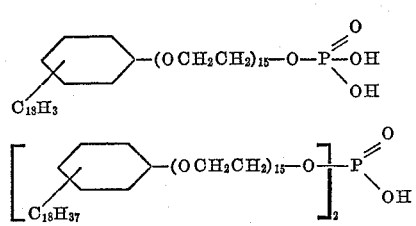

|  | Parts by Weight |
|---|---|
| (first ester) | 47 |
| (second ester) | 36 | said composition containing 1% iodine.

4. A composition of matter according to claim 1 wherein the phosphate ester consists of a mixture of esters having the following composition:

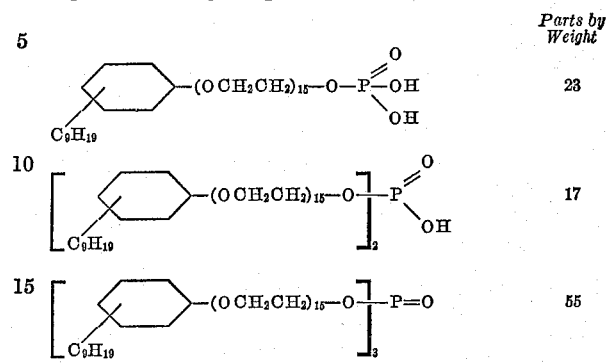

|  | Parts by Weight |
|---|---|
| (first ester) | 23 |
| (second ester) | 17 |
| (third ester) | 55 | said composition containing 14% iodine.

5. A composition of matter according to claim 1 wherein the phosphate ester consists of a mixture of esters having the following composition:

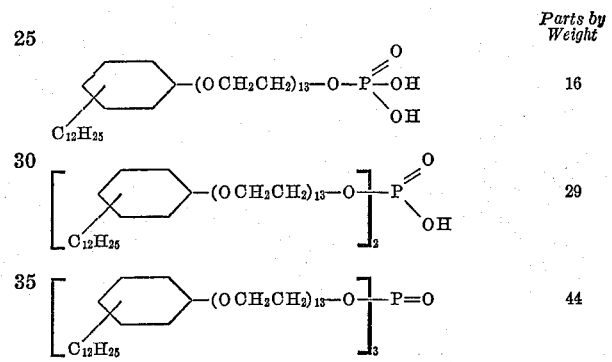

|  | Parts by Weight |
|---|---|
| (first ester) | 16 |
| (second ester) | 29 |
| (third ester) | 44 | said composition containing 5% iodine.

6. A composition of matter according to claim 1 wherein the phosphate ester has the following composition:

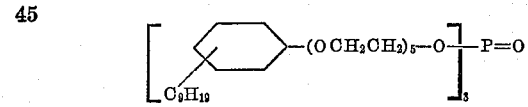

said composition containing 16% iodine.

References Cited in the file of this patent

UNITED STATES PATENTS 2,710,277  Shelanski _____ June 7, 1955

OTHER REFERENCES

Tsubomura et al.: J. Am. Chem. Soc. 82, 1314–1317 (1960).